United States Patent Office 2,814,649
Patented Nov. 26, 1957

2,814,649

PROCESS FOR SEPARATION OF CHLORINATED XYLENES

James E. Pritchard, Bartlesville, Okla., assignor to Phillips Petroleum Company, a corporation of Delaware No Drawing. Application April 25, 1955,
Serial No. 503,801

15 Claims. (Cl. 260—651)

This invention relates to separation of chlorinated xylenes. In one embodiment, this invention relates to the selective chlorination of xylenes and the recovery of the corresponding xylylene dichloride.

The products of this invention belong to the valuable class of organic halides known as alpha-omega dichlorides. These compounds are valuable as intermediates for chemical synthesis such as in producing xylylene glycols, the esters of which are useful as rubber plasticizers. The xylylene dichlorides as such, have been found useful as insecticides. These compounds can be represented by the following formulae:

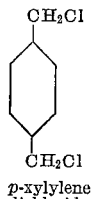 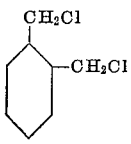 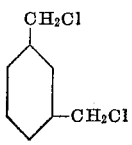

p-xylylene dichloride   o-xylylene dichloride   m-xylylene dichloride

By the methods of the prior art, xylene is chlorinated to the corresponding xylylene dichloride by first putting the xylene in solution, preferably in a fully chlorinated hydrocarbon such as carbon tetrachloride, and mixing or bubbling chlorine through the mixture in the presence of light or an oxidizing agent or both. During the chlorination, other chlorides, particularly the monochloride (i. e., xylyl chloride or methylchloromethylbenzene), will be formed and present in the reaction product. These chlorinated xylenes are then separated from the solvent such as by fractionation and the chlorinated xylenes separated by crystallization to recover the desired xylylene dichloride.

By the process of this invention, xylylene dichloride is separated from admixture with unreacted xylene and other chlorinated xylenes by selective crystallization of said xylylene dichloride by passing said admixture into a cold saturated acyclic hydrocarbon.

An object of this invention is to provide an improved method of producing and recovering xylylene dichlorides.

Another object of this invention is to provide a novel method of separating xylylene dichloride from xylyl chloride.

Other objects, advantages and features of this invention will be obvious to those skilled in the art having been given this disclosure.

I have found that xylylene dichloride produced along with other chlorinated xylenes and in admixture with unreacted xylene by contacting xylene with a predetermined amount of chlorine gas or strong chlorinating agent in the presence of light and particularly ultraviolet light and/or a free radical catalyst such as an organic peroxide or hydroperoxide can be recovered from said admixture by selective crystallization by introducing the reaction products into a cold paraffinic solvent, say at room temperature.

The chlorination of the xylene is promoted by the use of light, particularly ultraviolet light or a free radical catalyst, such as organic peroxides and hydroperoxides. When a catalyst is used, only a small amount is required, the amount generally being in the range of 0.05 to 1.0 weight percent catalyst based on the weight of the xylene. I generally prefer to add the catalyst intermittently as the reaction proceeds. Catalysts known to promote chlorination include benzoyl peroxide, diisopropylbenzene hydroperoxide, cumene hydroperoxide, dimethyl and diethyl alpha, alpha'-azodiisobutyronitrile, alpha, alpha'-azo bis (alpha, gamma-dimethylvaleronitrile) and the like, and I particularly prefer the organic peroxides and hydroperoxides.

The xylenes to which this invention is applicable are ortho-, meta-, and para-xylene.

The chlorination can be carried out in a vessel provided with means for agitation such as an autoclave or it can be carried out by bubbling the chlorine gas into the xylene or any other method of contacting the xylene with the chlorine can be employed. In any case the chlorination will be conducted in the absence of metal or metal salts known to catalyze nuclear chlorination. That is, iron and aluminum and their salts must be avoided. Most generally, the reaction vessel will be non-metallic, however, some metals, such as lead, are known to be non-catalytic. The chlorination is generally carried out at a temperature in the range of 100–300° F. and more generally at a temperature in the range of 200–250° F. The reaction time is generally in the range of 0.3 to 3 hours and more generally 0.5 to 1 hour is sufficient.

The chlorine required to completely chlorinate the xylene to xylylene dichloride is 2 mols chlorine per mol of xylene with hydrogen chloride being formed as by-product. Greater amounts of chlorine would tend to form the higher chlorinated materials and in general the maximum ultimate yield of the desired dichloride is obtained when approximately 1.5 mol of chlorine per mol of xylene is used. In general, the chlorine will be used at a ratio in the range of 1 to 2 mols chlorine per mol of xylene and preferably 1.3 to 1.7 mols per mol. By using the less than the theoretical chlorine requirement, the product will be comprised essentially of xylylene dichloride and xylyl chloride. The xylyl chloride does not crystallize under the conditions of the invention and can be separated from the solvent by means such as distillation and can be recirculated to the chlorination zone wherein further chlorination is effected.

After the chlorination is completed, the hydrogen chloride by-product and any unreacted chlorine should be removed in order to avoid the necessity of using non-metallic construction materials downstream from the reaction vessel. One convenient method of removing these materials is by passing an inert gas such as methane, ethane, nitrogen or carbon dioxide through the reactor to sweep out most of these materials. If desired, the remaining material can be neutralized with a small amount of an alkaline carbonate, i. e., 3 to 10 percent based on xylene charged. The preferred alkaline carbonates are potassium and sodium carbonates or bicarbonates.

The chlorinated product is then introduced into a saturated acyclic hydrocarbon at a temperature generally in the range of −90 to 200° F., and most generally at 0 to 80° F. The unchlorinated, monochlorinated and trichlorinated material will be miscible with or soluble in the solvent and the xylylene dichloride will crystallize. At room temperature, the unchlorinated xylene, the monochloroxylene and the trichloroxylene are completely miscible with these acyclic hydrocarbon solvents while the xylylene dichloride is substantially insoluble. For example, in isooctane, the xylylene dichloride is soluble only to the extent of 0.8 gm./100 gm. at room temperature (75° F.). It should be understood that sufficient solvent must be used to dissolve all of the unchlorinated and monochlorinated material. In general one-half to ten volumes of solvent per volume of reactor effluent can be used and I generally prefer two to five volumes per volume. The saturated acyclic hydrocarbon is preferably one which is liquid at room temperature, however, it is within the scope of the invention to use lower boiling hydrocarbon with lower temperatures and/or higher pressures to maintain the hydrocarbons in the liquid phase. The preferred hydrocarbons are those containing 5 to 15 carbon atoms per molecule which can be straight or branched chain. Examples of such hydrocarbons include: n-pentane, isopentane, n-hexane, 2,3-dimethylbutane, n-heptane, 2,3 - dimethylpentane, 2,4 - dimethylpentane, 3-methylhexane, n-octane, isooctane, decane, dodecane, pentadecane, 4,6,8-trimethylundecane, 4,5-diethyldecane, etc.

This invention will be further described by the following examples.

EXAMPLE I

Several runs were made wherein 98 percent pure para-xylene was chlorinated. The following procedure was used in all tests while varying only the chlorine to xylene molar ratio and reaction time.

The para-xylene was charged to a reaction vessel which contained an inlet tube for chlorine gas, a stirrer, a thermowell, and a reflux condenser at the gas outlet. After heating the reaction mixture to near the desired operating temperature, chlorine gas was passed into the para-xylene at the desired rate. Heat was evolved and served to maintain the reaction temperature with the aid of some external heat. The reflux condenser was cooled to about −40° C. to reflux the para-xylene and some chlorine but permit the HCl formed to pass out of the system. Approximately 0.1 weight percent benzoyl peroxide, based on the original amount of p-xylene charged, was added in three portions during the run.

After the desired operating time had elapsed the chlorine gas flow was stopped, the heat supply removed from the reactor and nitrogen was passed through the reaction mixture. This flushed the system of some chlorine and hydrochloric acid. About 1 percent water and 5 percent anhydrous sodium carbonate was then added. The reaction mixture was then filtered into approximately four times its volume of cold isooctane and the p-xylylene chloride crystallized. The crystals were then washed with cold isooctane giving a product of 90–98 percent purity. The water was added to dissolve any free chlorine and the hydrogen chloride. The water is adsorbed by the anhydrous alkali carbonate. When water is used, sufficient anhydrous alkali carbonate should be used to absorb all of the water as water of hydration thereby eliminating the necessity of separating water from the hydrocarbons. By using a chlorine to xylene ratio in the preferred range, no excess chlorine will be present and this wash treatment is not required.

The purity was determined by analysis of the chlorine content of the crystals. An impurity such as the trichloride or tetrachloride was assumed and the purity calculated. Table I gives the chlorine content of the various chlorides.

Table I

| Compound: | Percent chlorine |
|---|---|
| Monochloride | 25.3 |
| Dichloride | 40.6 |
| Trichloride | 49.8 |
| Tetrachloride | 58.2 |

A chlorination in which an excess of chlorine over the amount necessary to give the dichloride yielded a product which analyzed 54.7 percent chlorine. Assuming this product to be composed of the dichloride and tetrachloride there would be about 20 percent by weight of the p-xylylene chloride. After crystallization in isooctane the crystals formed analyzed 41.6 percent chlorine which is about 98 percent p-xylylene dichloride.

Table II gives the data on other runs performed. The crystals of the 1:5 mol chlorine/mol xylene run analyzed 39 percent chlorine. On the basis that the product was composed of the dichloride with the monochloride as impurity, this indicates a crystal which is 90 percent p-xylylene dichloride.

Table II

| Ratio Cl$_2$/xylene, mol/mol | Reaction time, hr. | Reaction temp., °F. | Amt. p-xylene charged, mols | p-Xylylene dichloride yield, mols | p-Xylylene dichloride yield, percent |
|---|---|---|---|---|---|
| 1.2 | ¾–1 | 200–230 | 3.3 | 0.57 | 28.9 |
| 1.36 | ¾–1 | 200–230 | 3.3 | 0.65 | 29.2 |
| 1.5 | ¾–1 | 200–230 | 3.3 | 1.21 | 48.8 |
| 2.0 | ¾–1 | 200–230 | 3.3 | 1.14 | 34.5 |
| 1.2 | 5 | 200–230 | 13 | 1.14 | 14.7 |

The percent p-xylylene dichloride yield was based on chlorine gas entering the system. After a distillation to remove the isooctane, the p-xylyl chloride can be returned to the reaction zone for further chlorination, thereby increasing the yield of the p-xylylene dichloride.

EXAMPLE II

In another series of runs, the chlorination was carried out in a continuous system. These runs were carried out in a three-necked flask fitted with a gas inlet tube, a mechanical stirrer, a dropping funnel, and a water-cooled condenser, the dropping funnel and condenser using the same neck of said three-necked flask. The flask was also equipped with an exit tube and valve in the bottom. The flask was charged with 100 grams of para-xylene containing about 0.1 percent benzoyl peroxide and the temperature raised to 230–300° F. Chlorine was introduced through the gas inlet tube which extended to near the bottom of the flask at the rate of about 3 mols per hour. Additional para-xylene containing 0.1 percent benzoyl peroxide was introduced by means of the dropping funnel at the rate of about 200 grams per hour. The valve (stopcock) in the bottom of the flask was adjusted to remove product at a rate sufficient to maintain the original level in the flask. At the described rate the residence time was about 30 minutes. The reaction proceeds in such a manner that substantially no unreacted chlorine was vented.

Other runs were made in the same manner but employing a residence time of 15 and 7.5 minutes respectively. This distribution of materials in the reaction effluent was determined for runs made at 30, 15 and 7.5 minute residence time respectively and is tabulated below:

| Residence time (min.) | Xylylene dichloride (percent) | Xylyl chloride (percent) | Para-xylene (percent) | Higher boiling (percent) |
|---|---|---|---|---|
| 30 | 55 | 30 | 10 | 4 |
| 15 | 57 | 20 | 20 | 3 |
| 7.5 | 27 | 53 | 20 | 0 |

The separation of products other than the xylylene dichloride was made by distillation and thermal effects may have had some influence on higher boiling materials, however, the data does indicate residence time has an effect.

In a preferred embodiment of this invention, the xylene is chlorinated in a continuous system having a residence time sufficiently short that no higher boiling materials will be formed (i. e. trichlorides and higher). By such operating conditions, the xylylene dichloride is recovered by precipitation and filtration, the solvent recovered by simple distillation and the unreacted xylene and the xylyl chloride returned to the chlorination zone. However, it is within the scope of this invention to operate with a longer residence time forming some higher chlorinated xylenes. When operating in this latter method, the xylene dichloride is recovered as above by introducing the reaction products into a cold hydrocarbon solvent and the precipitated xylene dichloride recovered. The solvent, xylene, xylyl chloride and higher chlorinated xylene are separated by fractional distillation and the xylyl chloride and the unchlorinated xylene returned to the chlorination zone.

I claim:

1. A process for separating admixture of chlorinated xylenes comprising xylyl chloride and xylylene dichloride, said process comprising introducing said admixture into at least one-half volume of a liquid saturated acyclic hydrocarbon per volume of said admixture and at a temperature no higher than 200° F. and separating the resulting crystallized xylylene dichloride from the resulting solution.

2. A process for separating an admixture of chlorinated xylenes comprising xylyl chloride and xylylene dichloride, said process comprising admixing said admixture of chlorinated xylenes into one-half to ten volumes of a liquid saturated acyclic hydrocarbon per volume of said admixture of chlorinated xylenes at a temperature in the range of −90 to 200° F. and separating the resulting crystallized xylylene dichloride from the resulting solution.

3. The process of claim 2 wherein the saturated acyclic hydrocarbon contains 5 to 15 carbon atoms per molecule.

4. A process for preparing xylylene dichloride of high purity which comprises contacting a xylene as the sole ingredient with 1 to 2 mols of chlorine per mol of xylene under conditions for chlorinating said xylenes on the methyl groups and introducing the resulting chlorinated material into 0.5 to 10 volumes of a liquid saturated acyclic hydrocarbon of 5 to 15 carbon atoms per volume of chlorinated material at a temperature not exceeding 200° F., and separating the resulting crystallized xylylene dichloride from the resulting solution.

5. A process for preparing xylylene dichloride of high purity which comprises contacting a xylene selected from the group consisting of ortho-xylene, meta-xylene, and para-xylene with 1 to 2 mols of chlorine per mol of xylene at a temperature in the range of 100 to 300° F., and in the presence of not more than 1 weight percent of a free radical catalyst based on the xylene weight as the sole catalytic agent, for a period of time in the range of 0.3 to 3 hours, mixing the resulting chlorinated xylenes with 0.5 to 10 volumes of a liquid saturated acyclic hydrocarbon of 5 to 15 carbon atoms per molecule per volume of reaction mixture at a temperature in the range −90 to 200° F. and recovering the resulting crystallized material consisting essentially of xylylene dichloride from the resulting solution.

6. The process according to claim 5 wherein the catalyst is zero and the chlorination is conducted in the presence of artificial light.

7. The process according to claim 5 wherein the catalyst is in the range of 0.5 to 1 weight percent based on the weight of xylene and is selected from the group consisting of organic peroxides and hydroperoxides.

8. A process for preparing xylylene dichloride of high purity which comprises contacting a xylene selected from the group consisting of ortho-xylene, meta-xylene, and para-xylene as the sole ingredient with 1.3 to 1.7 mols of chlorine per mol xylene at a temperature in the range of 200 to 250° F., and in the presence of 0.5 to 1 weight percent of a free radical catalyst based on the xylene weight selected from the group consisting of organic peroxides and organic hydroperoxides as the sole catalytic agent, for a period of time in the range of 0.5 to 1 hour in a non-metallic vessel, sweeping most of the by-product hydrogen chloride and unreacted chlorine from the product with an inert gas while in said vessel, adding 3 to 10 weight percent based on xylene weight of an anhydrous alkaline material to neutralize the remaining hydrogen chloride and chlorine, mixing the resulting chlorinated xylenes with 2 to 5 volumes of a liquid saturated acyclic hydrocarbon of 5 to 15 carbon atoms per molecule at a temperature in the range −90 to 200° F. for each volume of reaction product, and recovering the resulting precipitated high purity xylylene dichloride.

9. The process according to claim 8 wherein the anhydrous alkaline material is selected from the group consisting of sodium carbonate and potassium carbonate.

10. A process for preparing xylylene dichloride of high purity which comprises contacting a xylene selected from the group consisting of ortho-xylene, meta-xylene, and para-xylene as the sole ingredient with 1.3 to 1.7 mols of chlorine per mol xylene at a temperature in the range of 200 to 230° F. and in the presence of 0.5 to 1 weight percent of a free radical catalyst based on the xylene weight selected from the group consisting of organic peroxides and organic hydroperoxides as the sole catalytic agent, for a period of time in the range of 0.5 to 1 hour in a non-metallic vessel, sweeping most of the by-product hydrogen chloride and unreacted chlorine from the product with an inert gas while in said vessel, adding 3 to 10 weight percent based on xylene weight of an anhydrous alkaline material to neutralize the remaining hydrogen chloride and chlorine, mixing the resulting chlorinated xylenes with 2 to 5 volumes of a liquid saturated acyclic hydrocarbon of 5 to 15 carbon atoms per molecule at a temperature in the range 0° F. to 80° F. for each volume of reaction product, separating the crystallized chlorinated xylenes from solvent, fractionating the resulting solution to remove xylenes and recycling the thus removed xylenes to the chlorination step.

11. The process according to claim 10 wherein the xylene is para-xylene.

12. The process according to claim 10 wherein the xylene is meta-xylene.

13. The process according to claim 10 wherein the xylene is ortho-xylene.

14. A process for preparing xylylene dichloride of high purity which comprises continually introducing xylene to a chlorination zone under conditions wherein the methyl groups are chlorinated, maintaining said chlorination zone at a temperature in the range of 230–300° F., continually introducing 1 to 2 mols of chlorine per mol of xylene to said chlorination zone, continually withdrawing effluent from said chlorinating zone at a rate to maintain the volume of said chlorinating zone substantially constant, introducing said withdrawn effluent into a saturated acyclic hydrocarbon in the liquid state at a temperature in the range of −90 to 200° F., and recovering the resulting precipitated xylylene dichloride.

15. A process for separating admixture comprising xylylene dichloride in admixture with other xylenes selected from the group consisting of unchlorinated, and other chlorinated xylenes, said process comprising introducing said admixture into a saturated acyclic hydrocarbon in liquid state wherein said xylylene dichloride is precipitated and separating the resulting precipitated xylene dichloride from the solution.

References Cited in the file of this patent

UNITED STATES PATENTS 2,446,430    Norton _____ Aug. 3, 1948